United States Patent [19]

Vadasz

[11] Patent Number: 4,662,392

[45] Date of Patent: * May 5, 1987

[54] CHECK VALVE

[75] Inventor: Amnon F. Vadasz, Caracas, Venezuela

[73] Assignees: Intevep, S.A., Caracas, Venezuela; Vereinigte Edelstahlwerke A.G., Vienna, Austria; Oficina Tecnica HGB, Estado Miranda, Venezuela

[*] Notice: The portion of the term of this patent subsequent to Apr. 30, 2002 has been disclaimed.

[21] Appl. No.: 857,962

[22] Filed: May 1, 1986

Related U.S. Application Data

[63] Continuation-in-part of Ser. No. 659,689, Oct. 11, 1984, abandoned, which is a continuation-in-part of Ser. No. 518,193, Jul. 29, 1983, Pat. No. 4,513,778.

[51] Int. Cl.$^4$ .............................................. F16K 15/04
[52] U.S. Cl. ................................. 137/533.11; 251/368
[58] Field of Search ..................... 137/533.11, 533.13, 137/533.15, 539, 539.5; 251/368

[56] References Cited

U.S. PATENT DOCUMENTS

| 1,621,889 | 3/1927 | Larkin | 137/533.11 |
| 4,286,622 | 9/1981 | Ninomiya | 137/533.11 |
| 4,513,778 | 4/1985 | Vadasz | 137/533.11 |

Primary Examiner—Robert G. Nilson
Attorney, Agent, or Firm—Bachman & LaPointe

[57] ABSTRACT

In a subsurface positive displacement pump used in the petroleum industry for pumping crudes characterized by a high degree of suspended solid particles, a ball check valve comprising a valve ball and a valve seat assembly wherein the valve seat assembly comprises a hollow cylindrical body defining an orifice through which pumped fluid passes, the hollow cylindrical body being provided with a recess on the surface facing the valve ball in the region defining the orifice wherein an insert which forms the actual valve seat for the ball valve is secured in the recess. The insert is formed of a material having a hardness greater than the hardness of the material from which the cylindrical body is formed and the material from which the valve ball is formed is characterized by a high resiliency, a modulus of elasticity of between $0.1 \times 10^6$ psi to $15 \times 10^6$ psi and a hardness greater than that of the hollow cylindrical body.

17 Claims, 2 Drawing Figures

CHECK VALVE

CROSS REFERENCE TO RELATED APPLICATIONS

This application is a continuation-in-part of U.S. patent application Ser. No. 659,689, filed Oct. 11, 1984, now abandoned, which in turn is a continuation-in-part of U.S. patent application Ser. No. 518,193, filed July 29, 1983, now U.S. Pat. No. 4,513,778, Issued Apr. 30, 1985.

BACKGROUND OF THE INVENTION

The present invention relates to an improved check valve and, more particularly, an improved check valve for use in positive displacement subsurface pumps used in the petroleum industry for pumping crudes having a high degree of suspended solids.

Typical positive displacement pumps used in oil well pumping for pumping crudes employ check valves comprising a valve seat onto which a ball rests and seals against the seat. In a typical well pump, at least one check valve is located in the pump piston and a second check valve is positioned at the fluid inlet to the pump cylinder in which the piston is displaced so as to permit the flow of the pump fluid only in one direction. A typical valving arrangement of the kind discussed above is shown in U.S. Pat. No. 4,018,547 which disclosure thereof is incorporated herein by reference.

When pumping heavy crudes characterized by high contents of suspended solids there is a problem with wear on the valve ball and the valve seat which limits the effective life of the check valves. This wear is due to the effects of erosion caused by the suspended particles in the pumped fluid. In particular, as the valve ball moves closer to the valve seat, the velocity of the pumped fluid increases thereby increasing the likelihood of damage to the valve ball and valve seat by the suspended particles. When the valve ball and valve seat are damaged leakage of the pumped fluid will occur through the valve which results in a loss in volumetric efficiency of the pump and loss of production time when repair of the valve is necessary. Damage to the valve ball, while not desirable, is not as critical as damage to the valve seat. When the valve ball is damaged leakage tends to be minimal as the likelihood of the valve ball, which freely rotates, to seal on the valve seat exactly at the point of damage is low. However, if the valve seat itself is damaged then leakage through the valve might tend to be continuous. By making the valve ball out of a material which is characterized by high resiliency, that is, a modulus of elasticity of between $0.1 \times 10^6$ psi to $15 \times 10^6$ psi, the valve ball will tend to rest on the valve seat by elastically deforming. Therefore, even damage to the valve seat would not allow for continuous leakage as was the case with the prior art.

Accordingly, it is a principal object of the present invention to provide a ball check valve for use in positive displacement subsurface pumps used in the petroleum industry for pumping crudes which is less susceptible to damage by impact and erosion due to suspended solids in the pumped fluid.

It is a particular object of the present invention to provide a ball check valve wherein the valve seat comprises a hollow cylindrical body provided with an insert at the orifice of the body which forms the valve seat.

It is a further object of the present invention to provide a ball check valve as set forth above wherein the insert is formed of a material having a hardness greater than the hardness of the valve ball.

It is a still further object of the present invention to provide a ball check valve as described above wherein the valve ball is formed of a material having a high resilience, a modulus of elasticity of between $0.1 \times 10^6$ psi to $15 \times 10^6$ psi and a surface hardness greater than the hardness of the hollow cylindrical body.

Further objectw and advantages of the present invention will appear hereinbelow.

SUMMARY OF THE INVENTION

In accordance with th present invention, the foregoing objects and advantages are readily obtained.

The present invention relates to an improved ball check valve for use in positive displacement subsurface pumps used in the petroleum industry for pumping crudes characterized in part by a high degree of suspended solid particles. In accordance with the present invention, the ball check valve comprises a valve seat and a valve ball wherein the valve seat is comprised of a hollow cylindrical body defining an orifice through which fluid passes wherein the hollow cylindrical body is provided with an insert at the orifice of the hollow cylindrical body which forms the valve seat. In accordance wih the present invention, the insert is formed of a material having a hardness greater than the hardness of the material from which the valve ball is formed which material in turn is characterized by a high resiliency, a modulus of elasticity of between $0.1 \times 10^6$ psi to $15 \times 10^6$ psi and a surface hardness greater than that of the hollow cylindrical body. As a result of the relative differences in hardness of the various parts of the ball check valve as set forth above, the cylindrical body which is formed of the softest material dissipates a substantial part of the force generated by the impact of the valve ball on the hard insert. As a consequence of this dissipation of energy, the force of reaction on the valve ball itself is reduced thereby increasing the useful life of the ball. In addition, by making the ball valve from a material which is relatively softer than that used for the insert, any damage due to the effects of impact and/or erosion would tend to occur to the valve ball rather than the insert which forms the actual valve seat. As noted above, damage to the valve ball is not as critical as damage to the valve seat since the valve ball freely rotates thereby lowering the probability that the valve ball will seal on the valve seat at the exact point of damage. In accordance with a particular feature of the present invention, the valve ball is characterized by a high resiliency, a modulus of elasticity of between $0.1 \times 10^6$ psi to $15 \times 10^6$ psi and a surface hardness greater than that of the hollow cylindrical body.

DETAILED DESCRIPTION

Figure 1:
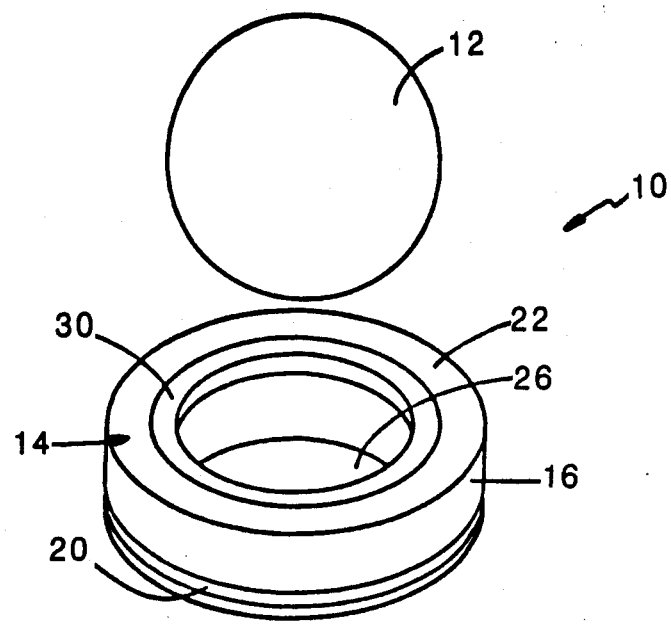
FIG. 1 is a perspective view showing the ball check valve in accordance with the present invention.
Figure 2:
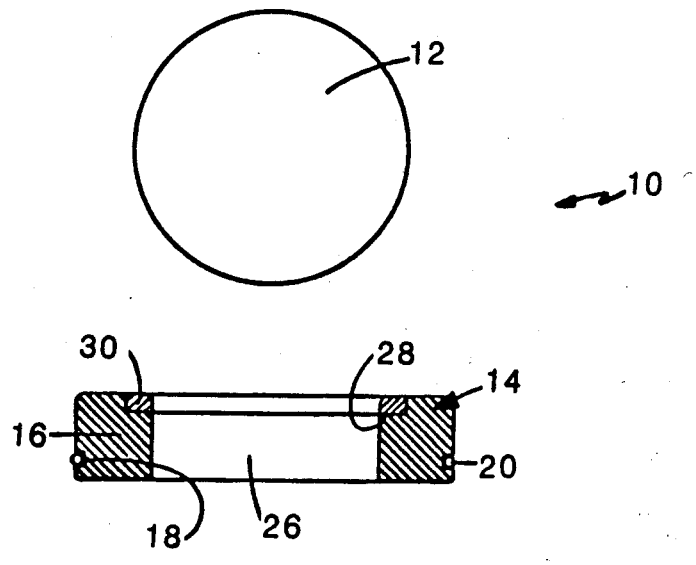
FIG. 2 is a sectional view of parts which form the ball check valve seat in accordance with the present invention.

Referring to FIGS. 1 and 2, a ball check valve 10 is illustrated which is particularly useful in subsurface positive displacement pumps used in the petroleum industry for pumping crudes characterized by a high degree of suspended solid particles.

The check valve 10 comprises a valve ball 12 and a valve seat assembly 14. With particular reference to FIG. 2, the valve seat assembly 14 comprises a hollow cylindrical body 16 having on the external surface thereof a groove 18 in which an O-ring packing seal 20 is located. The flat surface 22 of hollow cylindrical body 16 facing valve ball 12 in the area defining an orifice 26 is provided with a circular recess 28 into which an insert 30 which forms the actual valve seat for valve ball 12 is secured. The insert 30 may be secured in cylindrical body 16 by any suitable means such as press fit, gluing, metal bonding or the like. As can be seen from FIGS. 1 and 2, the orifice 26 defined by cylindrical body 16 and insert 30 has a diameter which is smaller than that of the valve ball 12 so as to allow the ball to sit and seal on insert 30 which forms the valve seat.

In accordance with the present invention, it is critical that the insert 30 be formed from a material having a hardness which is greater than the hardness of the material from which the valve ball 12 is formed. In addition, it is critical that the valve ball 12 in turn be formed from a material having a surface hardness greater than the material from which the hollow cylindrical body 16 is formed. It is preferred that insert 30 be formed of a material having a hardness of greater than 1300 on the Vickers scale. Suitable materials from which the insert 30 may be formed include ceramic materials or sintered materials in particular carbides, such as, for example, tungsten carbide. It is preferred that valve ball 12 be formed of material having a high resiliency, that is, a modulus of elasticity of between $0.1 \times 10^6$ psi to $15 \times 10^6$ psi and a surface hardness of between 600 to 1200 on the Vickers scale. Suitable materials from which the valve ball 12 may be formed include carbon based materials such as compressed graphite sold under the mark POCO and manufactured by Poco Graphite Inc. of Decatur, Tex. and polymeric materials sold under the mark TORLON and manufactured by Amoco. Finally, it is preferred that hollow cylindrical body 16 be formed of a material having a hardness of less than 500 on the Vickers scale. Suitable materials from which the hollow cylindrical body 16 may be formed include metallic materials and preferably stainless steel or other alloy steels.

As a result of the relative differences in hardness of the various parts of the ball check valve as set forth above, the cylindrical body which is formed of the softest material dissipates a substantial part of the force generated by the impact of the valve ball on the hard insert. As a consequence of this dissipation of energy, the force of reaction on the valve ball itself is reduced thereby increasing the useful life of the ball. In addition, by making the ball valve from a material which is relatively softer than that used for the insert, any damage due to the effects of impact and/or erosion would tend to occur to the valve ball rather than the insert which forms the actual valve seat. As noted above, damage to the valve ball is not as critical as damage to the valve seat since the valve ball freely rotates thereby lowering the propbability that the valve ball will seal on the valve seat at the exact point of damage. In accordance with a particular feature of the present invention, the valve ball is characterized by a high resiliency, a modulus of elasticity of between $0.1 \times 10^6$ psi to $15 \times 10^6$ psi and a surface hardness greater than that of the hollow cylindrical body.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a subsurface positive displacement pump used in the petroleum industry for pumping crudes characterized by a high degree of suspended particles, a ball check valve comprising a valve ball and a valve seat assembly wherein the valve seat assembly comprises a hollow cylindrical body defining an orifice through which pumped fluid passes, the hollow cylindrical body being provided with a recess on the surface facing the valve ball in the region defining the orifice wherein an insert which forms the actual valve seat for the ball valve is secured in the recess said insert is formed from a material having a hardness which is greater than the hardness of the material from which the hollow cylindrical body is formed and said valve ball is formed from a material having a high resiliency, a modulus of elasticity of between $0.1 \times 10^6$ psi to $15 \times 10^6$ psi and a hardness which is greater than the hardness of the material from which the hollow cylindrical body is formed so as to dissipate the force generated by the impact of the valve ball on the insert.

2. A ball check valve according to claim 1 wherein the hardness of the material from which said insert is formed is greater than the surface hardness of the material from which the valve ball is formed such that any effects of impact and erosion would tend to occur on the valve ball rather than the insert.

3. A ball check valve according to claim 2 wherein said hollow cylindrical body is provided with a groove on the external cylindrical surface thereof.

4. A ball check valve according to claim 3 wherein an O-ring seal is provided in said groove.

5. A ball check valve according to claim 2 wherein said insert is formed from a material having a hardness of greater than 1300 on the Vickers scale.

6. A ball check valve according to claim 5 wherein said valve ball is formed from a material having a hardness of between 600 and 1200 on the Vickers scale.

7. A ball check valve according to claim 5 wherein said insert is formed from a sintered carbide material.

8. A ball check valve according to claim 7 wherein said insert is formed of tungsten carbide.

9. A ball check valve according to claim 1 wherein said hollow cylindrical body is formed of a material having a hardness of less than 500 on the Vickers scale.

10. A ball check valve according to claim 9 wherein said valve ball is formed from a material having a surface hardness of between 600 and 1200 on the Vickers scale.

11. A ball check valve according to claim 2 wherein said insert is formed from a material having a hardness of greater than 1300 on the Vickers scale.

12. A ball check valve according to claim 11 wherein said valve ball is formed from a material having a hardness of between 600 and 1200 on the Vickers scale.

13. A ball check valve according to claim 12 wherein said hollow cylindrical body is formed of a material having a hardness of less than 500 on the Vickers scale.

14. A ball check valve according to claim 13 wherein said insert is formed from a sintered carbide material.

15. A ball check valve according to claim 14 wherein said insert is formed of tungsten carbide.

16. A ball check valve according to claim 5 wherein said insert is formed from a ceramic material.

17. A ball check valve according to claim 13 wherein said insert is formed from a ceramic material.

* * * * *